(12) United States Patent
Osman

(10) Patent No.: US 10,845,845 B2
(45) Date of Patent: *Nov. 24, 2020

(54) PRESSURE SENSING TO IDENTIFY FITNESS AND COMFORT OF VIRTUAL REALITY HEADSET

(71) Applicant: Sony Interactive Entertainment Inc., Tokyo (JP)

(72) Inventor: Steven Osman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 262 days.

This patent is subject to a terminal disclaimer.

(21) Appl. No.: 15/281,919

(22) Filed: Sep. 30, 2016

(65) Prior Publication Data
US 2017/0276943 A1     Sep. 28, 2017

Related U.S. Application Data

(63) Continuation of application No. 15/082,335, filed on Mar. 28, 2016, now Pat. No. 10,359,806.

(51) Int. Cl.
*G06F 1/3231*     (2019.01)
*G06F 1/3234*     (2019.01)
(Continued)

(52) U.S. Cl.
CPC ............ *G06F 1/163* (2013.01); *A63F 13/211* (2014.09); *A63F 13/212* (2014.09); *A63F 13/213* (2014.09); *A63F 13/25* (2014.09); *A63F 13/285* (2014.09); *A63F 13/32* (2014.09); *A63F 13/327* (2014.09); *A63F 13/33* (2014.09); *A63F 13/335* (2014.09); *A63F 13/533* (2014.09); *A63F 13/85* (2014.09); *G02B 27/017* (2013.01); *G02B 27/0172* (2013.01); *G06F 1/1686* (2013.01); *G06F 1/3231* (2013.01); *G06F 1/3234* (2013.01); *G06F 1/3265* (2013.01); *G06F 3/011* (2013.01); *G06F 3/013* (2013.01); *G06F 3/016* (2013.01); *G06F 3/167* (2013.01); *A63F 13/218* (2014.09); *A63F 2300/1087* (2013.01);
(Continued)

(58) Field of Classification Search
CPC .......... G06F 1/163; G06F 3/011; G06F 3/167; G06F 1/3231; G06F 3/016; Y02D 10/173; G02B 2027/0178; G02B 27/017; A63F 2300/8082; A63F 13/212; A63F 13/533; A63F 13/211; A63F 13/25; A63F 13/285; A63F 13/218; A63F 13/85; H04N 21/4781; H04N 21/8547
See application file for complete search history.

(56) References Cited

U.S. PATENT DOCUMENTS 3,588,237 A * 6/1971 Aldrich ................ F41G 3/2627
                                                          352/39
5,713,804 A * 2/1998 Socci ................... A42B 3/0433
                                                          473/211
(Continued)

*Primary Examiner* — Temesghen Ghebretinsae
*Assistant Examiner* — Karin Kiyabu
(74) *Attorney, Agent, or Firm* — John L. Rogitz

(57) ABSTRACT

A sensor generates signals representing whether a computer game headset is being worn properly so that the wearer may be advised. The sensor may be a pressure sensor or motion sensor or stretch sensor on the headset, or it may be a camera that images the wearer and uses image recognition to determine if the headset is on correctly.

10 Claims, 6 Drawing Sheets

(51) Int. Cl.
*G06F 1/16* (2006.01)
*G06F 3/16* (2006.01)
*G06F 3/01* (2006.01)
*A63F 13/25* (2014.01)
*A63F 13/85* (2014.01)
*A63F 13/213* (2014.01)
*A63F 13/285* (2014.01)
*A63F 13/211* (2014.01)
*A63F 13/335* (2014.01)
*A63F 13/327* (2014.01)
*A63F 13/32* (2014.01)
*A63F 13/33* (2014.01)
*G02B 27/01* (2006.01)
*A63F 13/533* (2014.01)
*A63F 13/212* (2014.01)
*A63F 13/218* (2014.01)

(52) U.S. Cl.
CPC ... *A63F 2300/405* (2013.01); *A63F 2300/407* (2013.01); *A63F 2300/8082* (2013.01); *G02B 2027/014* (2013.01); *G02B 2027/0138* (2013.01); *G02B 2027/0178* (2013.01); *Y02D 10/153* (2018.01); *Y02D 10/173* (2018.01)

(56) References Cited

U.S. PATENT DOCUMENTS

| | | | | |
|---|---|---|---|---|
| 5,815,126 | A * | 9/1998 | Fan | G02B 27/017 345/7 |
| 8,134,593 | B2 * | 3/2012 | Otsuki | H01M 10/44 200/61.7 |
| 8,135,440 | B2 * | 3/2012 | Hong | G02B 27/017 455/556.1 |
| 8,411,907 | B2 * | 4/2013 | Nelson | G06F 3/005 250/206 |
| 8,953,027 | B2 * | 2/2015 | Horiuchi | G02B 27/2228 348/55 |
| 9,128,283 | B1 * | 9/2015 | Heinrich | G02B 27/017 |
| 9,250,442 | B2 * | 2/2016 | Cho | G02B 27/017 |
| 9,417,452 | B2 * | 8/2016 | Schowengerdt | G06F 3/012 |
| 9,696,404 | B1 * | 7/2017 | Doyle | G01S 3/7864 |
| 2003/0038919 | A1 * | 2/2003 | Lin | G02C 7/086 351/57 |
| 2008/0136916 | A1 * | 6/2008 | Wolff | G06F 3/012 348/169 |
| 2008/0278678 | A1 * | 11/2008 | Howell | G02C 5/001 351/158 |
| 2011/0194732 | A1 * | 8/2011 | Tsuji | G06K 9/00288 382/103 |
| 2011/0288659 | A1 * | 11/2011 | Nelson | G05B 9/02 700/21 |
| 2011/0304464 | A1 * | 12/2011 | Nelson | G08B 21/18 340/573.1 |
| 2011/0305375 | A1 * | 12/2011 | Nelson | G06F 3/005 382/118 |
| 2011/0316881 | A1 * | 12/2011 | Yoshifuji | H04N 13/376 345/634 |
| 2011/0316987 | A1 * | 12/2011 | Komoriya | G06K 9/00228 348/51 |
| 2013/0007307 | A1 * | 1/2013 | Kang | G06F 13/14 710/16 |
| 2013/0231941 | A1 * | 9/2013 | Pham | G06Q 50/22 705/2 |
| 2013/0258070 | A1 * | 10/2013 | Corriveau | H04N 13/0022 348/51 |
| 2013/0278631 | A1 * | 10/2013 | Border | G02B 27/017 345/633 |
| 2013/0289748 | A1 * | 10/2013 | Nelson | F16P 3/142 700/79 |
| 2014/0068838 | A1 * | 3/2014 | Beers | A61F 5/028 2/243.1 |
| 2014/0240544 | A1 * | 8/2014 | Kim | H04N 5/23293 348/231.99 |
| 2014/0341441 | A1 * | 11/2014 | Slaby | G06F 21/32 382/117 |
| 2014/0375542 | A1 * | 12/2014 | Robbins | G02B 27/0176 345/156 |
| 2015/0103306 | A1 * | 4/2015 | Kaji | G02C 5/045 351/128 |
| 2015/0279102 | A1 * | 10/2015 | Fleck | G06T 19/006 345/419 |
| 2016/0054570 | A1 * | 2/2016 | Bosveld | A41D 20/00 2/209.3 |
| 2016/0140332 | A1 * | 5/2016 | Pfursich | G06F 21/32 726/19 |
| 2016/0184703 | A1 * | 6/2016 | Brav | G06F 3/012 463/30 |
| 2016/0216760 | A1 * | 7/2016 | Trutna | G06F 3/015 |
| 2016/0259986 | A1 * | 9/2016 | Yun | G06K 9/00892 |
| 2016/0361512 | A1 * | 12/2016 | Lawrenson | A61M 16/0605 |
| 2017/0026577 | A1 * | 1/2017 | You | H04N 5/23238 |
| 2017/0045928 | A1 * | 2/2017 | Ishikawa | G06F 1/163 |
| 2017/0102767 | A1 * | 4/2017 | Kim | G06F 3/013 |
| 2017/0168323 | A1 * | 6/2017 | Gardner | G02C 13/005 |
| 2017/0249041 | A1 * | 8/2017 | Moller | G06F 3/0414 |
| 2017/0261388 | A1 * | 9/2017 | Ma | G01L 1/2287 |
| 2017/0326462 | A1 * | 11/2017 | Lyons | A63F 13/90 |
| 2018/0005386 | A1 * | 1/2018 | Thangappan | H04N 5/23293 |
| 2018/0010902 | A1 * | 1/2018 | Gong | G01B 7/16 |
| 2018/0088340 | A1 * | 3/2018 | Amayeh | G02B 27/0172 |
| 2018/0096503 | A1 * | 4/2018 | Kaehler | G06T 11/60 |

* cited by examiner

You are moving your head too fast. —500
→ Tighten Tension Strap —502

Is your headset loose? —600

It gets gnarly now! —700
→ Tighten Headset —702

900 — Select Profile
902 {
→ Big Hair
→ Bald
→ Hat Size >7
→ Hat Size <7

PRESSURE SENSING TO IDENTIFY FITNESS AND COMFORT OF VIRTUAL REALITY HEADSET

FIELD

The application relates generally to promoting the fitness and comfort of headsets, particularly virtual reality (VR) headsets, augmented reality (AR) headsets, headphones, and other head-worn computerized devices.

BACKGROUND

The use of headsets to provide virtual reality (VR) experiences particularly in computer gaming is increasing. As understood herein, VR headsets are typically worn by gamers for relatively extended periods. When worn properly, a headset should distribute pressure along certain points for comfort. If worn too loosely, too tightly, or otherwise inappropriately on the head, the pressure can shift to other points, causing the wearer discomfort. Further, a poor fit can make certain assumptions about tracking incorrect. For instance, if worn improperly the relationship of the device to the face of the wearer may be incorrect. Alternatively, if worn too loosely then the motion of the headset may not correlate to the motion of the head directly since there is a bit of decoupling. High frequency motions may be absorbed by the looseness and abrupt changes in head direction may be damped.

SUMMARY

Accordingly, at least one pressure sensor is mounted on at least one anticipated pressure point of a headset to generate a signal useful in ensuring that the headset weight is correctly distributed on the wearer's head. An anomalous pressure signal may be used to generate instructions presented on the display of the headset to adjust the fit of the headset. Or, a brain computer interface (BCI) sensor may be incorporated into the headset and the strength of the incoming signal may be used to determine whether the fit is correct or not.

In one aspect, a device includes a computer memory with instructions executable by a processor to receive a signal from a sensor, compare the signal to a reference, and based on the comparison, output a signal representing whether a virtual reality (VR) or augmented reality (AR) headset is being properly worn.

In some embodiments the sensor may be a pressure sensor mounted on the headset and the reference may be a pressure reference. In some examples the sensor may be a motion sensor mounted on the headset and the reference may be a motion reference. Yet again, the sensor may be a strain gage mounted on the headset and the reference may be a strain reference. Still further, the sensor can be a stretch sensor mounted on the headset and the reference can be a stretch reference. In other examples, the sensor can include a camera imaging a wearer of the headset wearing the headset, and the reference can include an image recognition template. The reference against which the sensor signal is compared may be keyed to a physical trait of the particular wearer of the headset.

In another aspect, a method includes receiving a signal from a sensor on a headset indicating whether the headset is being worn by a person. The method also includes, responsive to receiving the signal, determining whether the headset is being worn by a person, and responsive to a determination that the headset is not being worn by a person, automatically configuring the headset in a power conservation mode or deenergizing the headset.

In another aspect, an assembly includes a headset wearable by a person. At least one sensor is on the headset and is configured for generating signals at least in part based on motion of or contact with the person. A processor is configured to receive signals from the sensor, and storage has instructions executable by the processor for determining, based on the signal from the sensor, that the headset is not being properly worn. The instructions are also executable for, responsive to the determining, generating a human-perceptible signal.

The details of the present application, both as to its structure and operation, can best be understood in reference to the accompanying drawings, in which like reference numerals refer to like parts, and in which:

DETAILED DESCRIPTION

Figure 1:
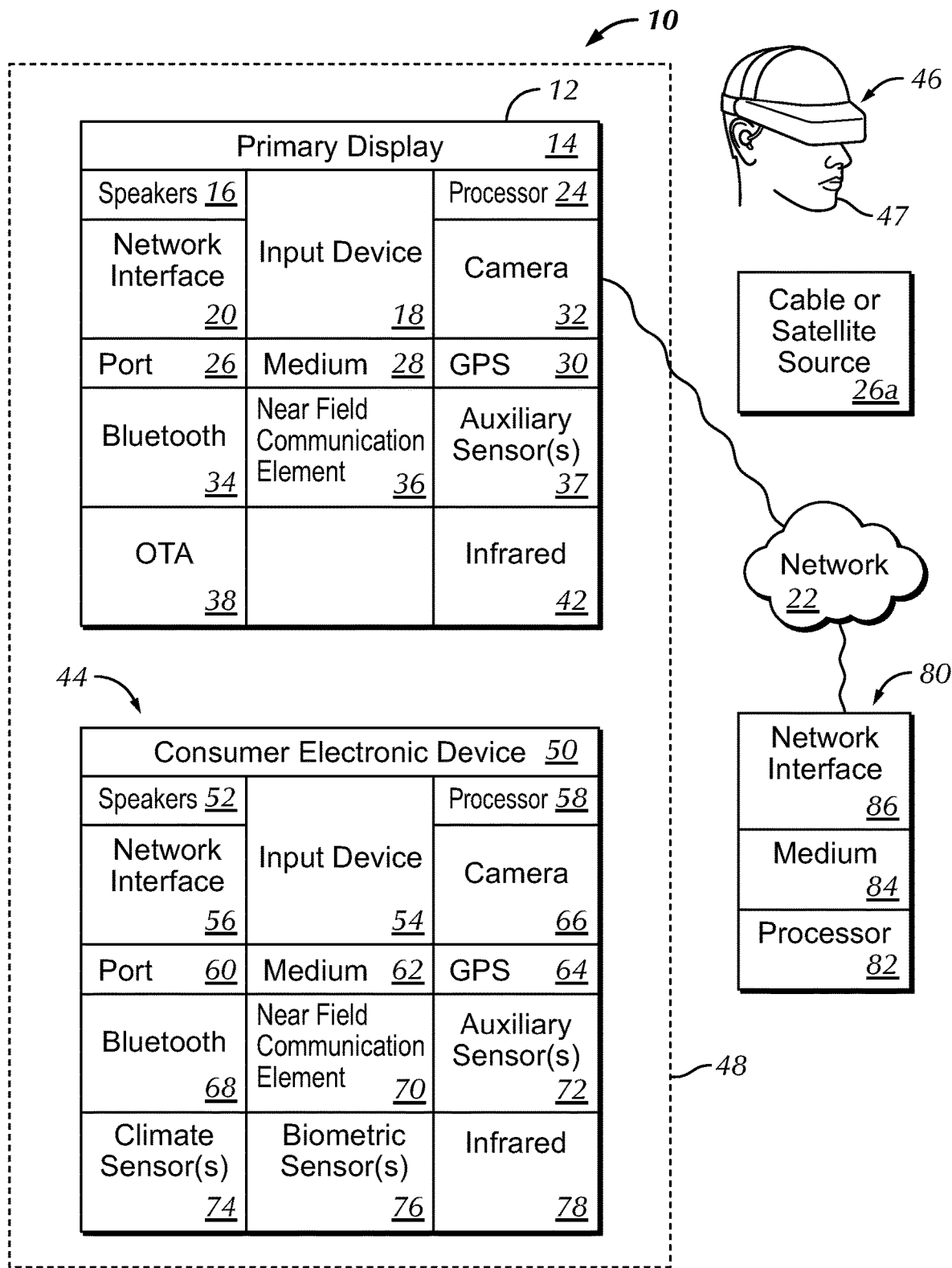
FIG. 1 is a block diagram of an example system including an example in accordance with present principles.

This disclosure relates generally to computer ecosystems including aspects of consumer electronics (CE) device networks such as but not limited to computer game networks. A system herein may include server and client components, connected over a network such that data may be exchanged between the client and server components. The client components may include one or more computing devices including game consoles such as Sony PlayStation® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). However, the AVD 12 alternatively may be an appliance or household item, e.g. computerized Internet enabled refrigerator, washer, or dryer. The AVD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g. communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as e.g. an audio receiver/microphone for e.g. entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVD 12 may also include one or more input ports 26 such as, e.g., a high definition multimedia interface (HDMI) port or a USB port to physically connect (e.g. using a wired connection) to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be, e.g., a separate or integrated set top box, or a satellite receiver. Or, the source 26a may be a game console or disk player containing content that might be regarded by a user as a favorite for channel assignment purposes described further below. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVD 12 is disposed in conjunction with the processor 24. However, it is to be understood that that another suitable position receiver other than a cellphone receiver, GPS receiver and/or altimeter may be used in accordance with present principles to e.g. determine the location of the AVD 12 in e.g. all three dimensions.

Continuing the description of the AVD 12, in some embodiments the AVD 12 may include one or more cameras 32 that may be, e.g., a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be used to send computer game audio and video to the AVD 12 via commands sent directly to the AVD 12 and/or through the below-described server while a second CE device 46 may include similar components as the first CE device 44. In the example shown, the second CE device 46 may be configured as a VR headset worn by a player 47 as shown. In the example shown, only two CE devices 44, 46 are shown, it being understood that fewer or greater devices may be used.

For example, principles below discuss multiple players 47 with respective headsets communicating with each other during play of a computer game sourced by a game console to one or more AVD 12.

In the example shown, to illustrate present principles all three devices 12, 44, 46 are assumed to be members of an entertainment network in, e.g., a home, or at least to be present in proximity to each other in a location such as a house. However, present principles are not limited to a particular location, illustrated by dashed lines 48, unless explicitly claimed otherwise.

The example non-limiting first CE device 44 may be established by any one of the above-mentioned devices, for example, a portable wireless laptop computer or notebook computer or gaming computer (also referred to as "console"), and accordingly may have one or more of the components described below. The first CE device 44 may be a remote control (RC) for, e.g., issuing AV play and pause commands to the AVD 12, or it may be a more sophisticated device such as a tablet computer, a game controller communicating via wired or wireless link with the AVD 12, a personal computer, a VR headset, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. A graphics processor 58A may also be included. Thus, the interface 56 may be, without limitation, a Wi-Fi transceiver, which is an example of a wireless computer network interface, including mesh network interfaces. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), a pressure sensor, etc). providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44. The CE device 44 may communicate with the AVD 12 through any of the above-described communication modes and related components.

The second CE device 46 may include some or all of the components shown for the CE device 44. Either one or both CE devices may be powered by one or more batteries.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server or an entire server "farm", and may include and perform "cloud" functions such that the devices of the system 10 may access a "cloud" environment via the server 80 in example embodiments for, e.g., network gaming applications. Or, the server 80 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
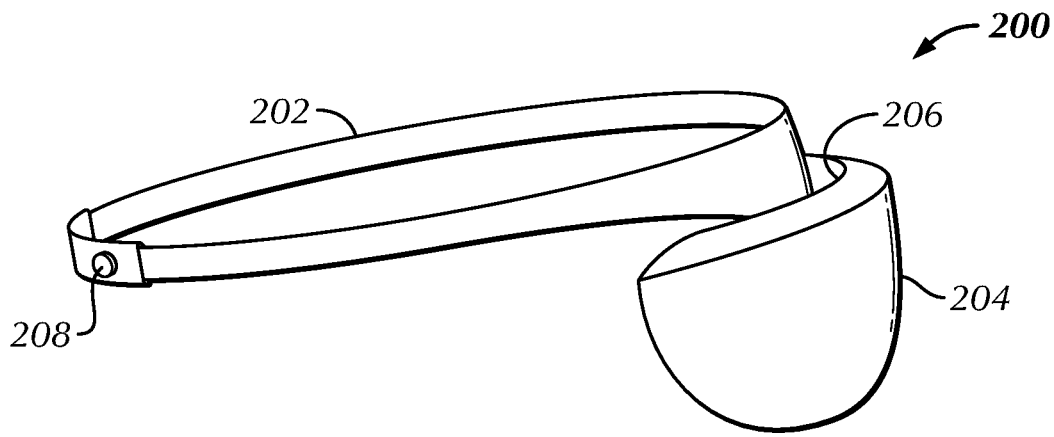
FIG. 2 is a perspective view of an example headset.
Figure 3:
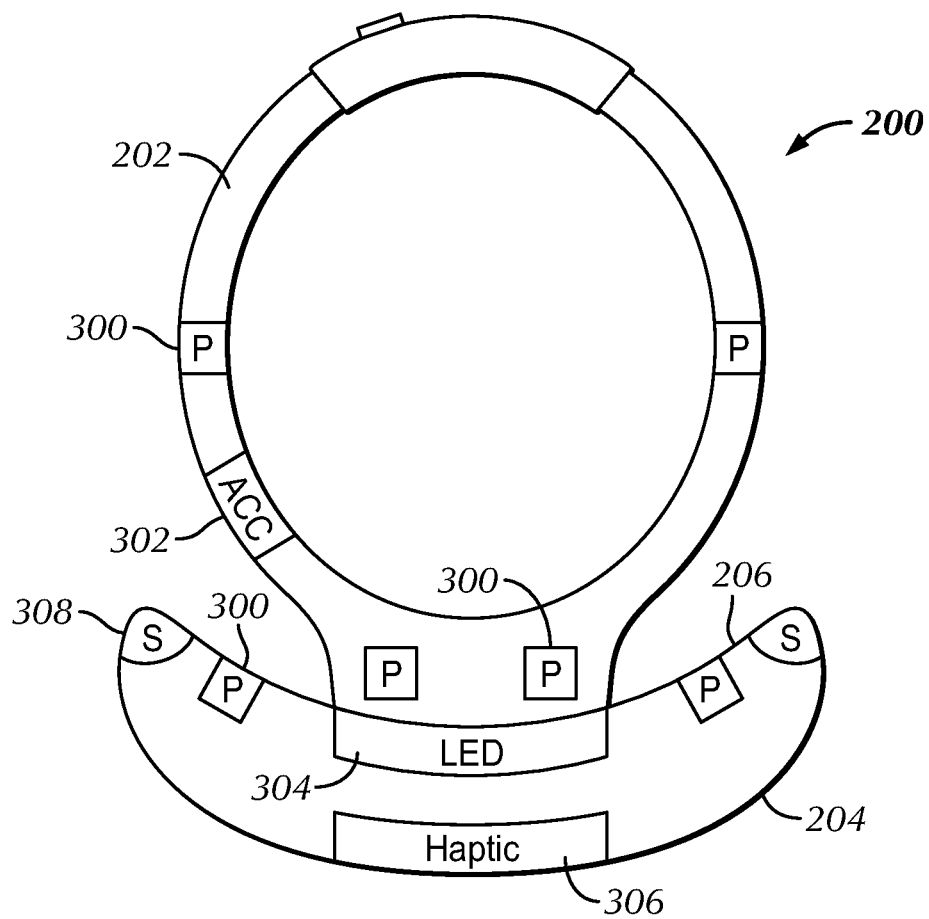
FIG. 3 is a bottom view of the headset shown in FIG. 2, schematically showing internal components.

FIGS. 2 and 3 show a headset 200 that may incorporate appropriate components of the second CE device 46 described above, as amplified below. The headset 200 may include a headband or strap 202 configured to be worn on a person's head and a head-mounted display (HMD) 204 attached to the head strap for placement of a display portion 206 on the inside or posterior surface of the HMD in front of the eyes of a wearer. Together, the headband or strap 202 and HMD 204 may establish a HMD assembly.

As shown in FIG. 2, the headband or strap 202 may be manually adjusted by means of a rotatable take-up knob 208 to tighten or loosen the headband or strap 202. The knob 208 can incorporate a slip clutch to limit how much tension can be applied to the headband or strap 202, in that rotation of the take-up knob 208 causes the clutch to slip at a tension threshold so that continued turning of the knob 208 does not further tighten the headband or strap 202. Alternative tension-limiting structure may include springs and detents. These structures are but two examples. An electronic limit may also be used in which an electric brake on the knob 208 is applied responsive to signals from the below-described pressure sensors exceeding a threshold.

FIG. 3 best shows that one or more pressure sensors 300 may be mounted on the headband or strap 202 and/or HMD 204. The pressure sensors 300 can be positioned in any desired location anticipated to create or establish a pressure point on the wearer's head. For example, pressure sensors may be located on portions of the headset 200 intended to touch the wearer's nose, eyebrows, temples, and so on. Another example of a location for a pressure sensor is in an area that would be expected to rest against eyeglasses of a wearer, as excessive pressure in such a location can be uncomfortable.

The pressure sensors may be implemented, in non-limiting examples, by one or more of piezoelectric sensors, piezoresistive strain gauges, capacitive pressure sensors, electromagnetic sensors such as Hall Effect sensors, and optical fiber sensors in which a physical change of an optical fiber may be used to detect strain due to applied pressure. Potentiometric sensors and thermal sensors may also be used. For locations at which a mere touch is considered to be incorrect, a touch sensor can be used.

As also shown in FIG. 3, in non-limiting examples, in addition to or in lieu of the pressure sensors 300, one or more motion sensors 302 such as accelerometers or gyroscopes may be engaged with the headset 200. Additionally or alternatively, one or more light emitting diodes (LED) 304 and/or one or more haptic feedback generators 306 may be mounted on the headset 200 for purposes to be shortly disclosed. Typically, the headset includes left and right audio speakers 308.

Figure 4:
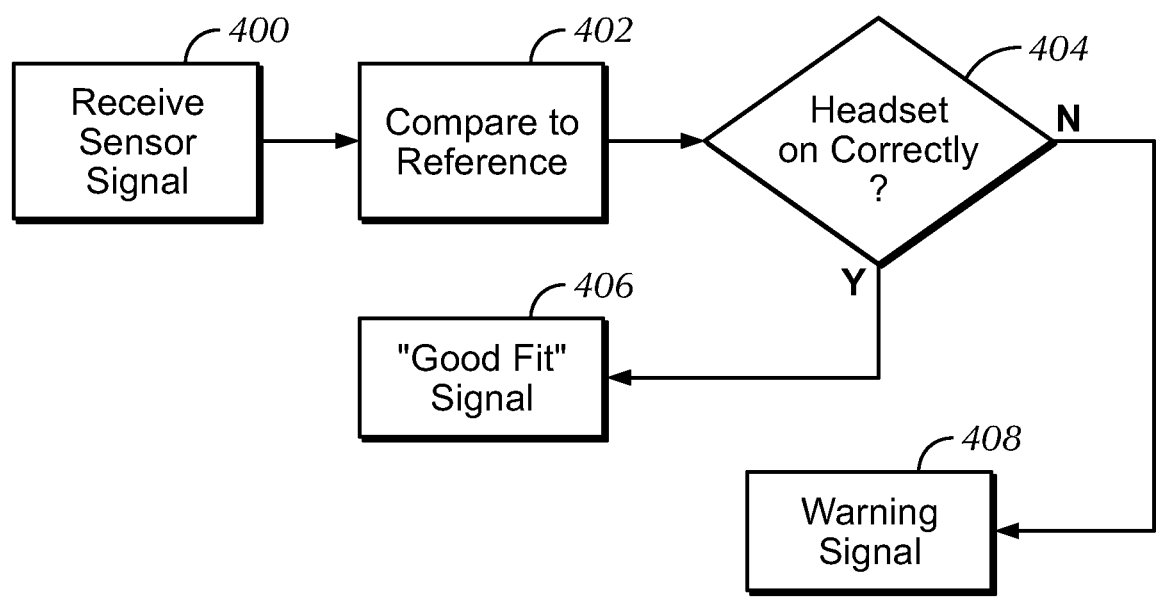
FIG. 4 is a flow chart of example logic.

Having described the above structure, attention is drawn to FIG. 4, which shows logic that may be implemented by the processor of the headset 200 or by the game console receiving signals from the headset 200 for using signals from the pressure sensors 300 to determine whether the positioning of the headset 200 on the wearer's head is correct as well as whether the pressure that the headset 200 exerts on the wearer is correct. Commencing at block 400, signals are received from the pressure sensors. The signals can indicate not only pressure but also the sensor ID, which identifies where in the headset 200 the sensor is located.

Moving to block 402, the signals are compared to a reference. The reference may be the same for all sensors or may vary by where the sensor is located as indicated by the sensor ID. In some embodiments, a reference may be established for all potential wearers (and be based on, e.g., headset weight and dimensions) or the reference may vary depending on the type of wearer physiology as described further below.

Moving to decision diamond 404, it is determined whether the headset is on correctly. In an example, if any pressure signal violates a threshold by, e.g., exceeding the reference, the headset is determined not to be on correctly. In another example, if no pressure signal violates a threshold, but a predetermined "good fit" relationship between the pressure signals from two or more pressure sensors is not met, the headset is determined not be on correctly. As an example, it may be desirable that the pressure of the headset on the wearer's nose is no more than 50% of the headset's pressure on the wearer's eyebrows, and only if the pressure from a sensor mounted on the nose portion of the headset does not exceed 50% of the pressure from a sensor mounted on the eyebrow portion of the headset is a positive test returned at decision diamond 404.

Responsive to a positive test the logic flows from decision diamond 404 to block 406 to return "good fit", which may result in a message of such being presented on the display or speakers of the headset or which may not result in any feedback at all being given to the wearer.

On the other hand, responsive to a negative test at decision diamond 404, in some embodiments the logic may flow from decision diamond 404 to decision diamond 407 to determine whether the wearer may have overridden an otherwise "poor fit" test. If not, the logic can proceed to block 408 to return a warning signal, examples of which are divulged further below, to alert the wearer that the headset is not being worn correctly or for the optimum comfort of the wearer. If the wearer has overridden and otherwise "poor fit" test result, however, the logic may move to block 409 to return "no error". Note that in some embodiments the override determination of decision diamond 407 may be omitted.

Wearer override input can take a plurality of forms. For example, "correct fitness" traits can be encoded by the wearer. As an example, the wearer can don the headset (at home, or in a store with an expert), and the correct fitness is established for the wearer based on the wearer's feedback for what feels comfortable. A photographic image of the wearer with the headset on in the "correct fit" configuration can be stored on the headset or online and associated with the user's profile. This reference can be used to override the reference at block 402.

Figures 5, 6, 7, 8, 9:
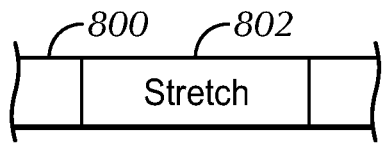
FIGS. 5-7 are example screen shots that can be presented in the head-mounted display (HMD) portion of the headset with respect to fit.
FIG. 8 is side view of an elastic strap for the headset, schematically showing a stretch sensor.
FIG. 9 is a screen shot of a user interface that can be presented on the headset or CE device for allowing a wearer to select a head profile.

For pressure references that vary by wearer physiology, pressure profiles can be empirically determined using test subjects having various physical traits, including various types of head shapes, head sizes, and hair styles. The same process can be used to establish maximum pressure thresholds by measuring pressure in headsets deliberately worn improperly by the test subjects. FIG. 9 discussed further below illustrates a UI that a wearer can employ to identify his or her category, and the reference for that category is then used at block 402.

Alternatively, the size and shape of the wearer's head may be based on input from the pressure sensors themselves and/or contact sensors. For example, an uncharacteristically low pressure may be interpreted by the headset as the strap not being tight enough, but it may also be inferred to mean that the wearer has longer hair. Along these lines, the knob 208 in FIG. 2 may include a rotation indicator that indicates how much the knob has been turned by the wearer, with greater rotation of the knob being correlated by the headset to a small head type and lesser rotation of the knob being correlated by the headset to a larger head type, for selection of the appropriate reference. The reference data once obtained from the test subjects may be stored in a cloud-based data store accessible by the headset 200.

In another implementation, in addition to or in lieu of using signals from the pressure sensors 300 in the logic of FIG. 4, signals from the motion sensor 302 may be used and compared to a motion reference at block 402. This is because, as understood herein, behaviors of the human head can be known/characterized. For instance, maximum comfortable head rotation, acceleration, deceleration of the head can all be known, so if the signals from the motion sensor indicates a violation of any such values, then a negative test can be returned at decision diamond 404 based on the inference that, for instance, the headset is flopping around on the user's head instead of firmly donned thereon. In other words, device movement relative to the head can be identified by motion signals that a firmly mounted headset, being constrained by the head, cannot generate.

Either result 406, 408 in FIG. 4 can precipitate feedback being presented to the wearer regarding fit of the headset. For example, audible feedback may be presented on the speakers 308 that the headset is or is not being worn properly. The audible feedback may be a human voice advising the wearer of fit or a pleasant tone or sound, for example, indicating that the headset is being worn properly. In addition or alternatively, haptic feedback may be provided using the haptic generator 306. As an example, the haptic generator 306 may be activated to shake the wearer's head up and down to indicate correct wear or left and right to indicate poor wear. As another example, the haptic generator 306 may be actuated to produce a relatively gentle "bad" shake that escalates to a progressively violent shake if the wearer does not take corrective action.

In addition or alternatively, FIGS. 5-7 illustrate that visible feedback may be presented on, e.g., the display portion 206 of the headset. FIG. 5 illustrates a message 500 that the wearer is moving his or her head too quickly, and an advisory 502 to tighten the headband or strap 202. FIG. 6 illustrates at 600 an advisory that the headset may be worn too loose. Either of these advisories may be responsive to the motion sensor indicating a motion that exceeds that a correctly worn headset would experience. Yet again, visible feedback may be keyed to the computer game being played by the wearer, advising within presentation of the game at 700 in FIG. 7 that the game is about to get violent and further advising at 702, based on, e.g., relatively light pressure being indicated by the pressure sensors 300, to tighten the headset. Other feedback may be that the wearer is moving his or her head too quickly for the tightness currently imposed on the headset as indicated by the pressure sensor signals.

Another visible feedback indication may be implemented using the LED 304. The LED may be illuminated to be, for example, red responsive to a negative test result being returned at block 406. The LED may be illuminated to be, e.g., green responsive to a positive test result being returned at block 406, and/or to indicate that the headset battery is charged. A motion sensor or mercury switch may be used to determine when to energize the LED so that, e.g., the LED may be energized responsive to motion of the headset.

FIG. 8 illustrates a headband or strap 800 that is elastic, and that may have a stretch sensor 802 embedded in it. The signal from the sensor 802 may be used in the logic of FIG. 4 for example to determine whether the headset is being worn too tightly, as indicated by excessive stretching of the strap 800.

As alluded to above, the wearer may be able to input his or her head type, and FIG. 9 shows an example UI 900 for allowing the wearer to select his or her head type from a list 902 that may be presented on the display portion 206 of the headset 200.

Figure 10:
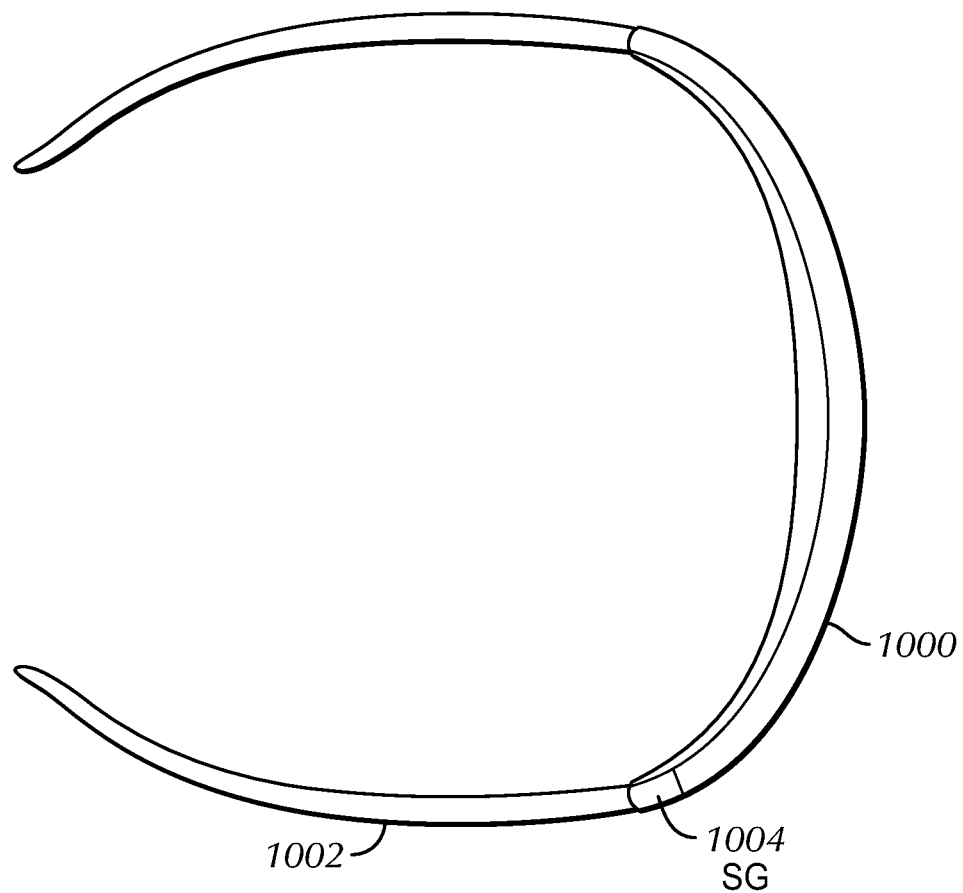
FIG. 10 is a top view of an alternate headset that uses glasses-type arms, schematically showing a strain gage.
Figure 11:
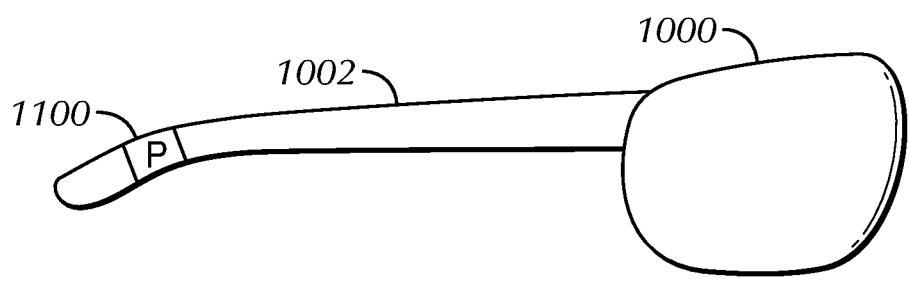
FIG. 11 is a side view of the headset of FIG. 10, schematically showing a pressure sensor.

FIGS. 10 and 11 illustrate yet another structure for determining whether a headset is worn correctly. In the example shown, a HMD 1000 is engaged with the wearer by means of glasses-like arms 1002. A sensor 1004 such as a strain gage may be placed, for example, on the junction between the HMD 1000 and arms 1002 to indicate whether excessive strain is being imposed (e.g., outwardly away from the user's head) and, thus that the headset is not being worn properly.

FIG. 11 shows that additionally or alternatively, one or more pressure or contact sensors 1100 may be located on the arms 1002 and preferably on the curved portion of the arm as shown. As recognized herein, certain portions of the arms 1002 may be anticipated to be in contact with the head if the headset is properly worn, so that a signal indicating no contact may be used to indicate that the headset is being worn improperly, generating a warning signal.

As described above, pressure, motion, touch, and stretch sensors can be used to indicate whether a person is correctly wearing the headset 200. Additionally, proximity sensors may be mounted on respective portions of the headset 200 with the distance sensed between them used to determine how far out the headset is extended front to back, based on how far the portions are from each other. An excessive distance can result in a warning signal being generated.

Figure 12:
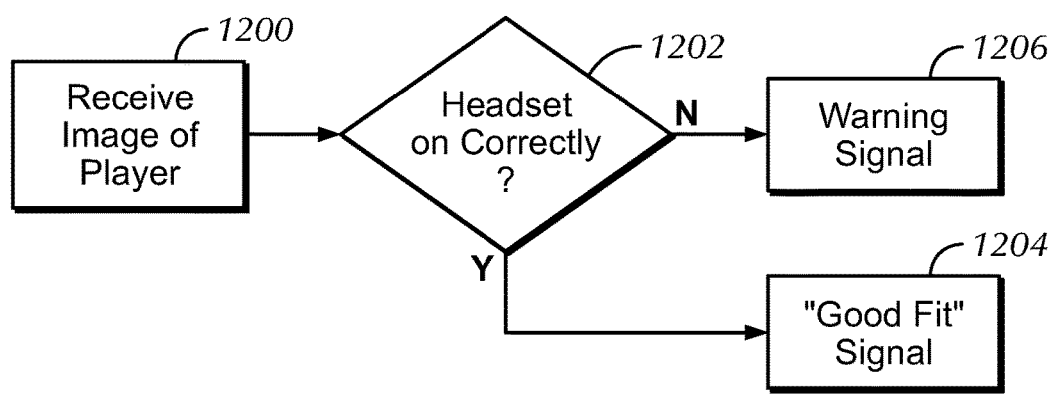
FIG. 12 is a flow chart of example logic for using an image of a wearer to determine correct positioning of a headset.

Still further, FIG. 12 illustrates alternate logic in which an image of the person is received at block 1200 from any of the cameras disclosed herein. Proceeding to decision diamond 1202, using image recognition on the received image and comparing it to a database of "correct" wear images, the logic may determine whether the person is wearing the headset correctly. If so, "good fit" is returned at block 1204; otherwise, a warning may be generated at block 1206.

As but one example, an image of the wearer can be used to determine the distance between the eyes and other parameters, which is then used to determine if the headset is being worn/tilted too far forward or backward or otherwise incorrectly. The image of the wearer may be gathered while the wearer puts the headset on, and/or after the wearer has put the head set on.

In some embodiments, a wearer can be imaged by any of the cameras described herein, and face recognition executed on the image to determine the wearer's identity and which fitness trait to use. Instead of face recognition to determine identity, the wearer's login information may be used, or a pattern of motion associated with the wearer such as the breathing pattern or walking gait of the wearer.

Moreover, the above-mentioned references for the "correct fitness" traits can be encoded by the wearer. As an example, the wearer can don the headset (at home, or in a store with an expert), and the correct fitness is established for the wearer based on the wearer's feedback for what feels comfortable. A photographic image of the wearer with the headset on in the "correct fit" configuration can be stored on the headset or online and associated with the user's profile. Future comparisons can be based off of this history reference measurement.

Figure 13:
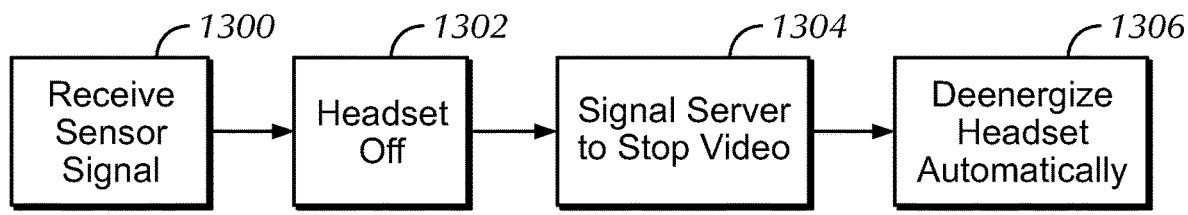
FIG. 13 is a flow chart of example logic for automatically determining when a headset is not being worn, for power conservation.

FIG. 13 illustrates power saving logic that may implemented. The above-described sensors and other components of the headset may be deenergized or put into a power conservation mode at block 1306 when the headset determines that it is not being worn at block 1302 based on a signal received at block 1300 indicating, as but one example, no pressure being applied to the pressure sensors. Moreover, upon determination that it is not being worn, the headset can send a signal at block 1304 to the game server to stop feeding the A/V content to the headset. The server may then present the content on the AVD 12 which may be nearby. In addition to or in lieu of the foregoing, the signal to the console can indicate that the console should stop making two images (because one image is used for each eye on the headset) and to stop distorting the images (based on optics, such as straight lines being distorted to curved to still look straight when viewed by the user), and instead simply send one image to the AVD 12.

It will be appreciated that whilst present principals have been described with reference to some example embodiments, these are not intended to be limiting, and that various alternative arrangements may be used to implement the subject matter claimed herein.

What is claimed is:

1. An assembly, comprising:
   a headset wearable by a person;
   at least a first sensor on the headset configured for generating signals at least in part based on motion of or contact with the person;
   at least one processor configured to receive the signals from the first sensor, the processor being programmed with instructions for:
      determining, based at least in part on at least one signal from at least the first sensor, at least one characteristic of headset wear; and
      based at least in part on the determining, output feedback keyed to a computer simulation being played by a wearer of the headset such that the feedback is output based on at least determining upcoming content of the computer simulation; and
      alerting the wearer of the headset to adjust the headset based at least in part on the upcoming content.

2. The assembly of claim 1, wherein at least the first sensor is mounted to the headset at a location corresponding to a location of at least a portion of eyeglasses of the wearer of the headset, the eyeglasses not being the headset.

3. The assembly of claim 1, wherein the determining at least one characteristic of headset wear is executed at least in part based on a relationship between signals from the first sensor and a second sensor.

4. The assembly of claim 1, wherein the instructions are executable to identify headset movement relative to the head of the wearer as part of the determining at least one characteristic of headset wear.

5. A method, comprising:
   determining, based at least in part on at least one signal from at least a first sensor on a headset wearable by a person, at least one characteristic of headset wear, the signal being generated based at least in part on motion of or contact with the person;
   based at least in part on the determining, outputting feedback keyed to a computer simulation being played by a wearer of the headset such that the feedback is output based on at least determining upcoming content of the computer simulation; and
   alerting the wearer of the headset to adjust the headset based at least in part on the upcoming content.

6. The method of claim 5, wherein the determining at least one characteristic of headset wear is executed at least in part based on a relationship between signals from the first sensor and a second sensor.

7. The method of claim 5, comprising identifying headset movement relative to the head of the wearer as part of the determining at least one characteristic of headset wear.

8. A device comprising:
at least one computer storage that is not a transitory signal and that comprises instructions executable by at least one processor for:
- determining, based at least in part on at least one signal from at least a first sensor on a headset wearable by a person, at least one characteristic of headset wear, the signal being generated based at least in part on motion of or contact with the person;
- based at least in part on the determining, outputting feedback keyed to a computer simulation being played by a wearer of the headset such that the feedback is output based on at least determining upcoming content of the computer simulation; and
- alerting the wearer of the headset to adjust the headset based at least in part on the upcoming content.

9. The device of claim 8, wherein the determining at least one characteristic of headset wear is executed at least in part based on a relationship between signals from the first sensor and a second sensor.

10. The device of claim 8, wherein the instructions are executable for identifying headset movement relative to the head of the wearer as part of the determining at least one characteristic of headset wear.

* * * * *